Aug. 25, 1942.  A. F. GUYLER ET AL  2,293,818
PRODUCTION OF KNITTED FABRICS
Filed Nov. 28, 1939  3 Sheets-Sheet 1
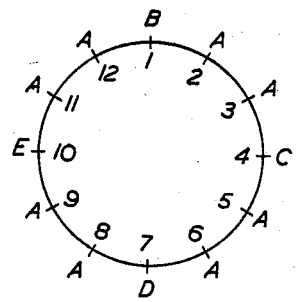
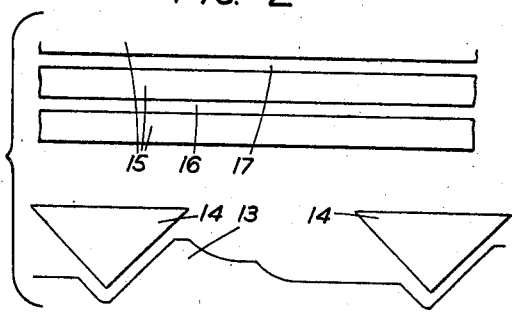
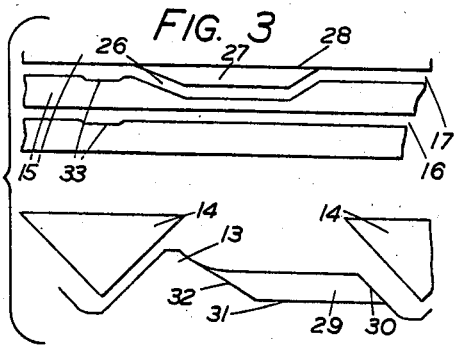
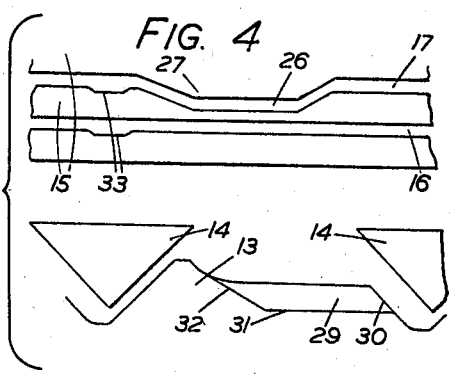
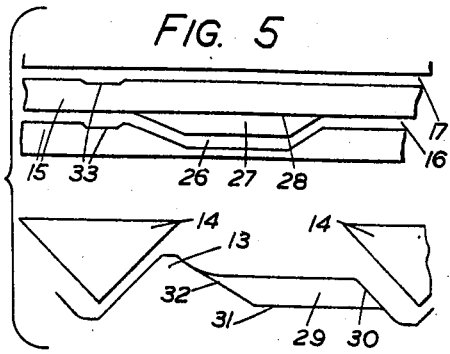
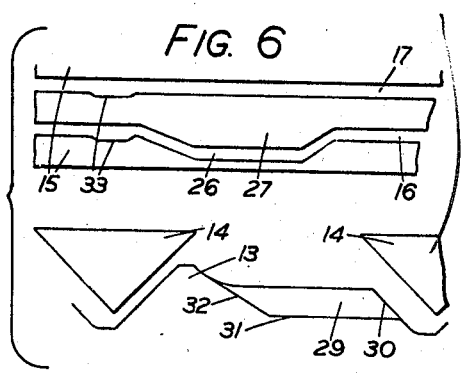
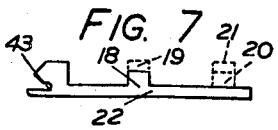
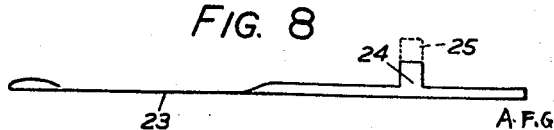
Inventors
A. F. GUYLER
W. H. BOALER
by
Attorneys Aug. 25, 1942.　　A. F. GUYLER ET AL　　2,293,818
PRODUCTION OF KNITTED FABRICS
Filed Nov. 28, 1939　　3 Sheets-Sheet 2

Inventors
A. F. GUYLER
W. H. BOALER
by
Attorney

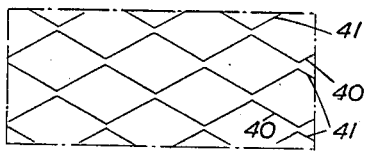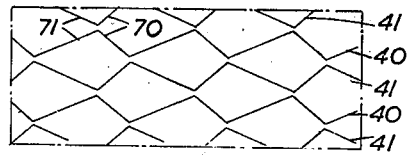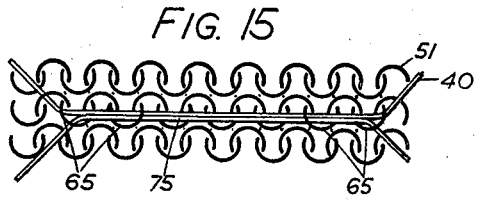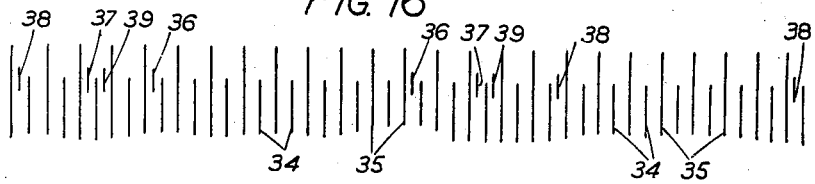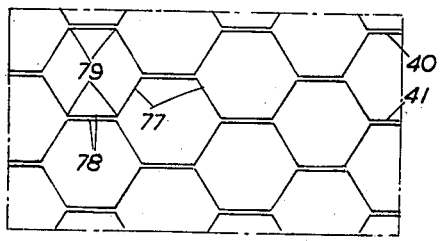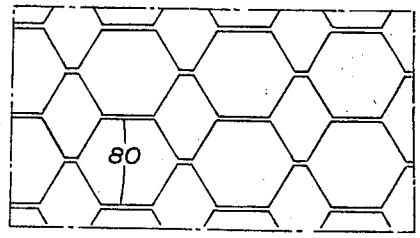

UNITED STATES PATENT OFFICE 2,293,818

PRODUCTION OF KNITTED FABRICS

Albert Fairholme Guyler and William Henry Boaler, Spondon, near Derby, England, assignors to Celanese Corporation of America, a corporation of Delaware Application November 28, 1939, Serial No. 306,476
In Great Britain November 29, 1938

22 Claims. (Cl. 66—12)

This invention relates to the production of knitted fabrics, and is especially concerned with the production of a knitted fabric having a high degree of elasticity by reason of a content therein of elastic yarn. It is an object of the present invention to provide a fabric that is knitted on a circular knitting machine and possesses a substantial degree of elasticity both in the direction of the courses of the fabric and in the direction of the wales.

According to the present invention an elastic knitted fabric is produced on a circular knitting machine by knitting relatively inelastic yarn on the needles of the machine in a succession of courses, introducing an elastic yarn at intervals among said courses and to spaced needles, laying in said elastic yarn on said spaced needles and, in at least one later course, laying in the previously introduced portion of said elastic yarn on other needles spaced from each other and from the needles on which said elastic yarn was previously laid in. By laying in an elastic yarn in this manner the fabric is given an elasticity, due to contraction of the elastic yarn after the fabric has left the needles of the machine, and this elasticity appears not only in the direction of the courses but also in the direction of the wales of the fabric by reason of the fact that the elastic yarn between the different points at which it is laid in, extends over several courses.

For the purpose of feeding and laying in the elastic yarn suitable elements may be provided to which the elastic yarn is fed under tension, the elements being subsequently moved so as to bring the elastic yarn in front of the needle, so that as the needle rises the yarn may slip below the beard or latch thereof in order to lay the elastic yarn into the fabric. The elements, however, will not work all at once, certain of them presenting the yarn to the needles as soon as it is fed while the others retain the elastic yarn and cause it to be held for several courses before being laid in to the fabric at one or more subsequent courses.

A particularly convenient form of apparatus for carrying out the present invention is a multi-feeder machine having a circular series of needles mounted in tricks in a needle cylinder, a plurality of feeders each adapted to knit a ground thread on said needles, a circular series of sliders mounted in tricks in a dial similar to the dial of a rib-knitting machine, said sliders being fewer in number than said needles and adapted to slide laterally between said needles, means at at least one feeder for feeding elastic yarn to said sliders, and means for actuating said sliders selectively at different feeds to pass said elastic thread over the heads of spaced needles in said circular series of needles whereby said elastic thread is laid in by selected sliders at spaced needles at the feeder at which it was fed, and is retained by other sliders not actuated at said feeder, and laid in by said other sliders at at least one subsequent feeder. With such a machine, means are necessary for the differential actuation of the dial elements or sliders, e. g. long and short butts differently actuated by cams, or separate cams operating on differently positioned butts, in order that some elements may be actuated at a certain feed or feeds and others at other feeds. A multi-feed circular rib-knitting machine may be adapted for the purpose of the invention by removing the dial needles and replacing some of them at intervals round the dial with the horizontal movable elements for presenting the elastic yarn to the needles.

The horizontally slidable elements may be grouped in any convenient relationship. Thus, they may be of two kinds, both adapted to be actuated to perform the same movements, but at different feeders. By disposing the elements of the two kinds alternately round the dial, and disposing the feeders at which the two kinds of sliders are respectively actuated alternately round the machine (separated by groups of feeders at which neither kind is actuated), the elastic yarn may be drawn in a simple zig-zag, extending from one course over several courses to another course and back, and being laid in at each turning point. By feeding elastic yarn each time the elements are actuated, the laying in of a new yarn for the first time is effected simultaneously with the laying in of an old yarn for the second time, so that the different elastic yarns meet, and the successive zig-zags form a pattern of diamonds or lozenges. Alternatively the elements may be divided into three or more groups, elastic thread being fed at some, only, of the feeders at which said sliders are operated, so that an elastic yarn, after being presented by the first group, is retained and presented later by a second group, and retained and presented still later by a third group and so on. By these means the elastic yarn may be laid in in other forms than a simple zig-zag, e. g., so as to produce hexagonal figures, and, further, the production of long floats of elastic yarn on the back of the fabric may be more readily avoided. Each elastic yarn may be completely laid in before the next elastic yarn is fed to the needles. It is preferable, however, as indicated above, that the last presentation of each elastic yarn should take place simultaneously with, and on the same elements as the first presentation of a new elastic yarn so that the fabric produced may be elastic throughout.

The differential actuation of the horizontal movable elements may be effected by any convenient means. Thus the elements may be provided with butts for actuation by a cam system, and the butts may be of different lengths for use in conjuction with a cam system adapted to operate the different butts in different manners. Alternatively or in addition the butts may be placed at different distances along the lengths of the elements and be actuated by separate cam systems. Alternatively again more complex differential actuating means may be employed controlled by pattern chains, drums or the like. Even with quite simple means, however, substantial variations in the nature of the fabric can be produced and, if desired automatic means may be provided to alter the mode of differential actuation of the elements, so as to produce a fabric in which different configurations of the elastic yarn are produced at different parts of the length of the fabric.

For the purpose of laying the elastic yarn into the fabric the elastic yarn is preferably fed inside the needle circle and pushed outwards over the head of the appropriate needle, which subsequently rises inside the elastic yarn and to such a height that the elastic yarn slips below its beard or latch. In order to avoid the possibility that the adjacent needles to those desired may rise inside the elastic yarn means may be provided for the differential actuation of the needles, so as to raise the adjacent needles to a silghtly greater height than the needles on which the yarn is to be laid in, whereby it becomes impossible for the elastic yarn to pass over the heads of the adjacent needles although it passes over the heads of the needles desired. Thus, needles having long and short butts may be used for this purpose together with a cam system for the differential actuation of the needles having different butts.

It is preferable that the elastic thread should be fed under a substantial tension, sufficient in itself to bring it to the desired condition of elongation, the tension in the yarn being thereby ample to hold it inwards in engagement with the presenting elements that are to retain it for laying in at a later course. However, elastic yarns of the kind that are held in an extended condition by means of a gum or size may be employed under a lower tension, provided that the lower tension under which they are fed is carefully regulated to keep them in engagement with the presenting elements.

The fabrics produced in accordance with the present invention are particularly suitable for the production of bathing costumes. For this purpose the elasticity in both directions enables the fabric to adapt itself closely to the figure of the wearer, so that the costume may be made without elaborate shaping being necessary in the cutting out of the garment.

By way of example some forms of the fabric, method and apparatus according to the present invention will now be described in greater detail with reference to the accompanying diagrammatic drawings, in which Fig. 1 is a diagram showing the arrangement of feeds and cams in a 12-feeder circular knitting machine arranged to operate according to the invention;

Figs. 2–6 show the different forms of the needle and slider cams employed in the arrangement shown in Fig. 1;

Figs. 7 and 8 show the forms of slider and needle respectively, to be actuated by the cams shown in Figs. 2–6;

Fig. 12 is a view showing on a smaller scale the general arrangement of the elastic thread of the fabric illustrated in Fig. 11;

Fig. 13 is a modification of Fig. 12;

Figs. 14 and 15 show two modifications of details of Fig. 11;

Fig. 16 is a diagrammatic front elevation of another arrangement of needles and sliders;

Fig. 17 is a view similar to Figs. 12 and 13 showing the layout of the elastic threads produced by the arrangement shown in Fig. 16;

Fig. 18 is a further modification shown in a manner similar to Fig. 16; and

Fig. 19 shows the disposition of elastic thread produced by the arrangement shown in Fig. 18.

Figure 9:
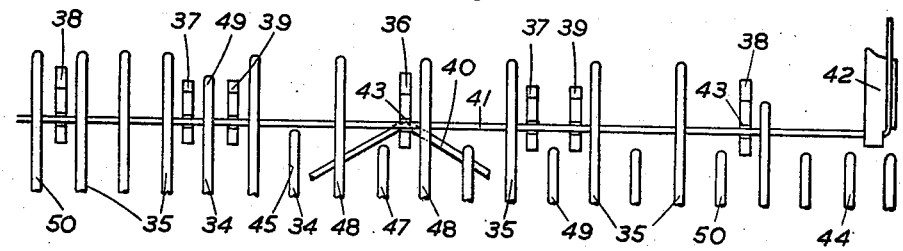
Figs. 9 and 10 are a front elevation and a side elevation, enlarged, of the needles and sliders in action.

The machine employed is a 12-feeder spring needle rib-knitting machine from which all the dial needles, for producing the ribs, have been removed and replaced by a fewer number of sliders of the form shown in Fig. 7. The twelve feeders of the machine are indicated in Fig. 1 by the numerals 1 to 12 and the different cam systems employed at the different feeders are indicated by the letters A, B, C, D and E. The cam system A employed as shown in Fig. 1 as acting at feeders 2, 3, 5, 6, 8, 9, 11 and 12 is shown in Fig. 2 and comprises needle cams 13, 14 of the form ordinarily employed in the cylinder of a circular rib knitting machine, and dial cams 15 which at these feeders form two straight tracks 16, 17. The tracks 16 and 17 act upon the butts of sliders whose form is shown in Fig. 7. The slider butt 18 shown in full in Fig. 7 is acted upon by the track 16 and as shown in Fig. 7 is a short butt. The sliders, however, may have a long butt indicated in dotted line at 19, also acted upon by the track 16, or they may have a short butt 20 or a long butt 21 as also shown dotted in Fig. 11, the butts 20 and 21 being acted upon by the cam track 17. Since the cam tracks 16 and 17 in Fig. 2 are straight, however, they merely act to hold the sliders 22 stationary at these feeders. The needles 23 as shown in Fig. 8 may have either a short butt 24 as shown in full in Fig. 8 or a long butt 25 as shown dotted in Fig. 8. Both kinds of butts are actuated by the cams 13, 14 of Fig. 2 so as to effect knitting of a thread fed to the needle in the ordinary way.

The form of cam B employed at feeder 1 is illustrated in Fig. 3 and here it will be seen that the cams 15 form, in the track 17 (which is the inner track, nearer the axis of the machine) a deviation indicated at 26. The portion 27 of the cam forming the deviation 26, however, is not of the full height of the track but only of half the height of the track so as to form an edge 28. By these means the sliders having long butts 21 are pushed forward towards the needles while the sliders having short butts 20 are permitted to ride along the edge 28 and are not so pushed out. The cam track 16 is straight as in Fig. 2. A modification is also made, in Fig. 3, to the needle track 13, which, at the portion 29 corresponding to the beginning of the deviation 26 is, like the portion 27 of the slider cam, only of half depth. As a result of this, needles having long butts 25 as shown in Fig. 8 ride up the slope 30 of the cam 13 whereas needles having short butts 24 ride along the edge 31 and up the slope 32.

The cams C employed at feeder 4 are illustrated in Fig. 4 and are similar to those in Fig. 3 except that the portion 27 of the slider cam forming the deviation 26 is of full depth so that no edge 28 is formed. As a result sliders having short butts 20 (Fig. 7) are actuated in a manner precisely similar to the sliders having the long butts 21, both being pushed out towards the needles. Here again the cam 16 is a straight cam as in Fig. 2. The needle cams in Fig. 4, as also in Figs. 5 and 6, are modified in the same way as those of Fig. 3.

The cams D employed at feeder 7 and the cams E employed at feeder 10 are shown respectively in Figs. 5 and 6 and are similar respectively to the cams shown in Figs. 3 and 4 except that in these cases it is the cam track 16 that is modified while the cam track 17 is straight as in Fig. 2. Thus, by the cams shown in Fig. 5 only the sliders having long butts 19 as shown in Fig. 7 are actuated while in Fig. 6 the sliders having long butts 19 and also sliders having short butts 18 are actuated. In each of the cam tracks 16 and 17 shown in Figs. 3–6 the track is slightly relieved at 33 to allow a slight freedom to the sliders as the needles 23 are drawn to their lowest position by the needle cam 14, which is of the same form at all feeders.

Figure 10:
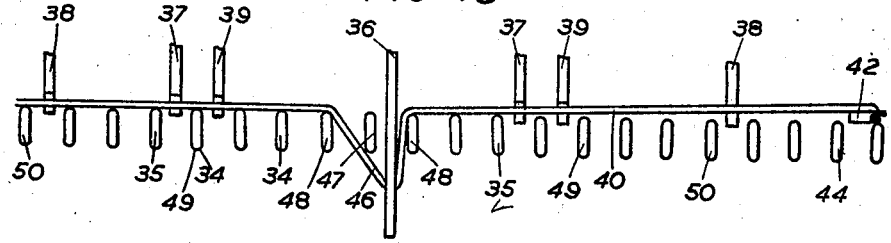

The motions and working relationships of the needles and sliders are shown in Figs. 9 and 10 in which the needles having short butts 24 (Fig. 8) are indicated by the reference numeral 34 while the needles having long butts are indicated at 35. The sliders having long inner butts 21 (only one is shown) are indicated at 36, the sliders having short inner butts 20 are indicated at 37, a slider having a long outer butt 19 is indicated at 38 and sliders having short outer butts 18 are indicated at 39. The sliders 36—39 act upon elastic threads 40, 41 which are fed by means of open thread guides 42 such as the one indicated at the right of Fig. 9. The thread 40 is fed by the guide 42 and engaged by the throats 43 of the sliders 36—39, this throat being also shown in Fig. 7. Figs. 9 and 10 show the motions of the needles and sliders covered by the cams illustrated in Fig. 3. The needle indicated at 44 is a long butt needle which is about to rise up the slope 30 of the cam 13 as shown in Fig. 3 while the needle indicated at 45 is a short butt needle that is about to ride up the slope 32 of the cam 13. The slider 36, to the throat 43 of which elastic thread 40 has been fed by the guide 42, has been pushed forward by the portion 27 of the slider cams 15 shown in Fig. 3. Of the remaining sliders shown, the sliders 37 have short inner butts 20 (Fig. 7) and are therefore not actuated by the portion 27 of the cam shown in Fig. 3, while the sliders 38 and 39 all have outer cam butts acted upon by the cam track 16, the sliders 38 having long butts and the sliders 39 having short butts. In either case, however, since the cam track 16 is straight at this feeder these sliders, like the sliders 37 are not pushed out. As will be seen from Fig. 10 the effect of pushing out the slider 36 is to push out a loop 46 consisting of the thread 40 and also of the thread 41 which was fed at a previous feeder, feeder 7.

The loop 46 passes over the head of the short butt needle indicated at 47 but is restrained by the two long butt needles 48 on either side which have previously been raised above the level of the slider 36 by means of the slope 30 of the needle cam 13. While the loop 46 is thus stretched out over the head of the needle 47 all the short butt needles 34, including the needle 47, are raised by the slope 32 of the needle cam 13 so that the loop of elastic thread 46 is retained in front of the needle 47. The slider 36 is then withdrawn by the cam track 17, as is shown by the form of the track in Fig. 3 and thereafter ordinary ground thread is fed to the needles which are then drawn down by the needle cam 14 to knit the ground thread in the ordinary way. This completes the action of the cam system illustrated in Fig. 3. Two more ground threads are then fed, and knitted by the cams 13, 14 as shown in Fig. 2 at the feeders 2 and 3. Then, at the feeder 4, before a ground thread is fed at that feeder, the cams shown in Fig. 4 come into action. The slider cams of this figure act both upon the sliders 36 and also upon the sliders 37. No elastic thread is fed at this feeder however, and as the sliders 36 have already delivered the elastic threads 40, 41 previously carried by them over the head of the needle 47, these sliders carry no elastic threads. According, it is only the sliders 37 which deliver elastic thread 40, fed to them at the preceding feeder (feeder 1) over the heads of the needles indicated particularly at 49 in Fig. 9, these needles being short butt needles adjacent to the sliders 37. Two more ground threads are then fed at feeders 5 and 6, at which are disposed cam systems of the kind shown in Fig. 2 and then at feeder 7 a further elastic thread is fed and on this feeder only the sliders 38 are actuated by the cam system shown in Fig. 5. The action at this feeder is the same as that at feeder 1 except that the sliders 38 are actuated instead of the sliders 36. These sliders carry the elastic thread 40 fed at feed 1 as described with reference to Figs. 9 and 10 and the thread 40 by this time is occupying, in relationship to the sliders 38, the same position that the elastic thread 41 in Figs. 9 and 10 occupied with reference to the sliders 36. In this way the elastic thread 40 and a new elastic thread corresponding to the elastic thread 40 in Figs. 9 and 10 are passed in the form of a loop similar to the loop 46 over the head of the needles indicated at 50, these being the short butt needles adjacent to the sliders 38. At the two next feeders 8 and 9 further ground thread is fed and knitted by the cams as shown in Fig. 2 and then at feeder 10 the cams E shown in Fig. 6 come into action and actuate the sliders 38 which now have no elastic thread and the sliders 39 which act in a way similar to the sliders 37 actuated at feeder 4. At the two feeders 11 and 12 ground thread is again knitted by the cams as shown in Fig. 2 and then the cycle is, of course, repeated.

Figure 11:
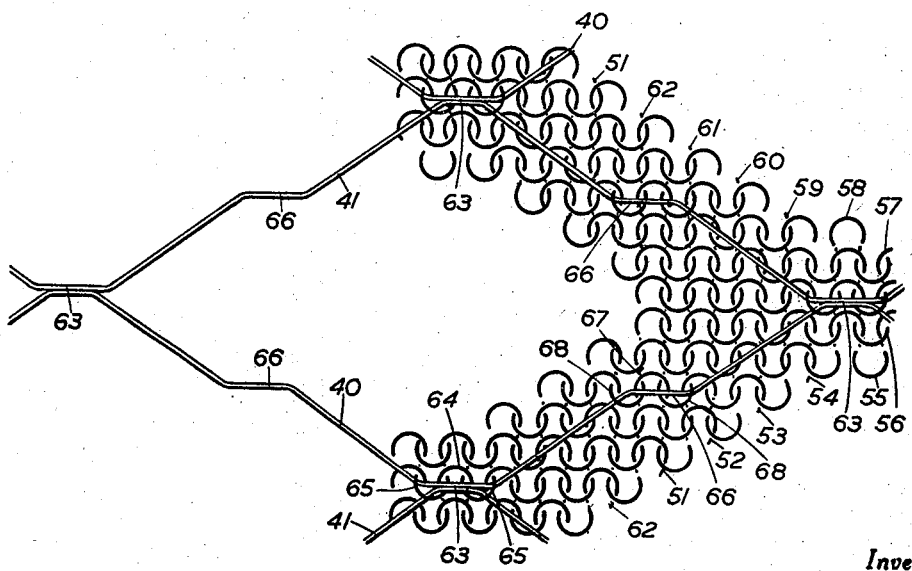
Fig. 11 is a diagrammatic view of the fabric produced according to the invention showing the relative configuration of ground thread and elastic thread.

The form of the fabric produced by the operations above described is shown in Fig. 11 in which the ground threads fed respectively at the feeders 1 to 12 are indicated by the reference numerals 51 to 62 and the elastic threads fed at feeders 1 and 7 respectively are indicated by the reference numerals 40, 41. At the point 63 near the bottom of the figure are the two elastic threads 40, 41 that were pushed over the head of the needle 47 at feeder 1, as described with reference to Figs. 9 and 10. The effect of pushing these threads over the head of the needle 47 is to associate them with the head 64 of the loop in the thread 62 fed at the previous feeder 12 so that the two portions 65 of the thread 51 fed at feeder 1 pass over the threads 40 and 41 on each side of the point 63 just as they pass over the thread 62 on each side of the head of the loop 64. In this way the elastic threads 40 and 41 are firmly attached in the fabric. Similarly at feeder 4 the thread 40 is associated at the point 66 in Fig. 11 with the head 67 of the thread 53 fed at feeder 3 and are crossed by the portions 68 of the thread 54 fed at feeder 4. At feeder 4 no elastic thread was fed and consequently it was only the old elastic thread 40 retained by the sliders 37 after feeder 1 that is treated in this manner and secured in the fabric. Precisely similar effects are produced at the points 63 and 64 shown elsewhere in Fig. 11 and this effect is produced all over the fabric.

It will be understood that the path of the elastic thread shown in Fig. 11 is only diagrammatic and, by reason of the stiffness of the relatively thick elastic threads 40 and 41, the kink shown at the points 64 will not occur in practice, since these threads will force the ground threads out of shape.

In the result the general configuration of the elastic threads 40 and 41 in the finished fabric will be as is shown in Fig. 12 in which a flat diamond pattern is shown. The pattern shown in Fig. 12 is produced by a symmetrical arrangement of the several sliders 36 to 38 with reference to the needles. It will be evident, however, that by an unsymmetrical arrangement many variations such as that shown in Fig. 13 may be produced. In Fig. 13 the sliders 38 have not been placed midway between the sliders 36 but have been placed further to the right than the mid-point so as to produce a distorted diamond effect. It may be convenient in this case to omit the sliders 37 and 39 in the short sides 70 of the distorted diamonds while retaining them so that the elastic thread is knitted into the fabric in the middle of the longer sides 71 only.

In the form of the invention described above the sliders 36 to 39 have been caused to pass the elastic thread over the head of one needle only as a result of which the portions 65 of the ground thread which retain the elastic thread are very close together. In order to ease the strain on that stitch in the thread 51 which lies between the two portions 65 thereof the elastic thread may be passed over the head of two needles instead of one only, which may be brought about simply by placing a short butt needle on each side, instead of on one side only of the slider concerned. The result is shown in the detailed Fig. 14 in which it will be seen that two loops 73, 74 of the thread 51 occur between the point 65 of the thread 51 which tie in the elastic threads 40, 41. In this way the strain on the thread 51 may be considerably eased if desired. The principle may be carried further in the manner shown in Fig. 15 by employing, for example two sliders 38 spaced apart by several needles and by these means, as shown in Fig. 15, a long float 75 of each of the threads 40, 41 may be formed between the portions 65 of the thread 51 by which the elastic threads 40 and 41 are tied in.

In Fig. 16 is shown an arrangement of needles and sliders in which this latter expedient is employed. The needles and sliders in this figure are given the references 34 to 39 as they are employed in Figs. 9 and 10, 34 representing the short butt needles and 35 the long butt needles.

Two sliders 36 are shown, separated from one another by a distance of 16 needles. Similarly, two sliders 38 are employed. Between each of the pairs of sliders 36 and 38 are disposed two sliders 37, 39 whose functions are the same as those of the sliders 37, 39 described with reference to Figs. 9 and 10. The form of fabric produced by an arrangement of needles of the kind shown in Fig. 16 is shown in Fig. 17 which is a figure similar in nature to Figs. 12 and 13. It will be seen that the elastic threads 40 and 41 form an open hexagonal pattern, being tied in to the fabric by the action of the sliders 37, 39 midway along each sloping side 77 and being tied in at each end of each horizontal side 78 at the points 79 by the action of the sliders 36 or 38.

Figs. 18 and 19 are similar to Figs. 16 and 17 but show an arrangement in which both the expedients illustrated in Figs. 14 and 15 are employed. Hitherto, the needles have in every case been shown as being alternately long and short butt needles. This is generally convenient in the machine as a great number of operations can thereby be produced without altering the needle arrangement. For some patterns, however, it is necessary that the needles should be arranged two and two, or, as shown in Fig. 18, in any special relationship. In Fig. 18 long butt needles have only been included where they are necessary for the purposes of the invention and all the remaining needles are short butt needles. Here it will be seen that the sliders 36 are disposed in pairs, separated by a distance of 16 needles while the sliders 38 are single but are placed between two short butt needles. As a result of this each pair of sliders 36 produces a long float 80 shown in Fig. 19 similar to the float 75 shown in Fig. 15. The sliders 38 pass the elastic thread 40, 41 over each of the two adjacent short butt needles and so produce an effect similar to that shown in detail in Fig. 14. The resulting pattern, as shown in Fig. 19, is a pattern of alternating hexagons and diamonds.

Having described our invention, what we desire to secure by Letters Patent is:

1. Method of producing elastic-knitted fabric on a circular knitting machine, said method comprising knitting relatively inelastic yarn on the needles of the machine in a succession of courses, introducing an elastic yarn at spaced intervals among said courses and to spaced needles, laying in said elastic yarn on said spaced needles and, in at least one later course, laying in a previously introduced portion of said elastic yarn on needles spaced from each other and from the needles on which said elastic yarn was previously laid in.

2. Method according to claim 1, comprising introducing fresh elastic yarn in each course in which the previously introduced portion of elastic yarn is last laid in, so as to produce a fabric elastic throughout its length.

3. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, means at at least one feeder for feeding elastic yarn to said sliders, and means for actuating said sliders selectively at different feeds to pass said elastic thread over the heads of spaced needles in said circular series of needles whereby said elastic thread is laid in by selected slides at spaced needles at the feeder at which it was fed, and is retained by other sliders not actuated at said feeder and laid in by said other sliders at at least one subsequent feeder.

4. A machine according to claim 3, comprising means for feeding an elastic thread at each feeder at which the portion of elastic thread previously fed is last laid in on the needles.

5. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles and, in a plurality of further courses, in the last of which the next elastic yarn is introduced, laying in the previously introduced portion of said elastic yarn on other needles spaced from the needles on which said elastic yarn was previously laid in, so as to produce a fabric elastic throughout its length.

6. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles and, in the course at which elastic yarn is next introduced, laying in the previously introduced portion of said elastic yarn on needles spaced from, and separated from each other by at least one of, the needles on which said elastic yarn was previously laid in, so as to produce a fabric elastic throughout its length.

7. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles, laying in said elastic yarn, in a subsequent course before the next elastic yarn is introduced, on needles spaced from each other and from the needles on which said elastic yarn was previously laid in, and, in the course at which the next elastic yarn is laid in, laying in the previously introduced portion of said elastic yarn at single points between those at which it was laid in in said subsequent course.

8. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles and, in at least one later course, laying in the previously introduced portion of said elastic yarn on other needles in groups, adjacent groups being separated from each other by at least one of the needles on which said elastic yarn was previously laid in.

9. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles and, in at least the next course at which elastic yarn is introduced, laying in the previously introduced portion of said elastic yarn on other needles in groups, adjacent groups being separated from each other by at least one of the needles on which said elastic yarn was previously laid in.

10. Method of producing elastic-knitted fabric on a circular knitting machine, said method comprising knitting relatively inelastic yarn on the needles of the machine in a succession of courses, introducing an elastic yarn at intervals among said courses and to spaced needles, laying in said elastic yarn on said spaced needles and, in a plurality of later courses, in the last of which fresh elastic yarn is introduced, laying in the previously introduced portion of said elastic yarn on other needles in groups, adjacent groups being separated from each other by at least one of the needles on which said elastic yarn was previously laid in.

11. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, means at at least one feeder for feeding elastic yarn to said sliders, means for actuating said sliders selectively at different feeds to pass said elastic thread over the heads of spaced needles in said circular series of needles, and means for differentially actuating the needles to raise the needles adjacent to said spaced needles to a height above the level of said sliders and said spaced needles before the said sliders are actuated, whereby said elastic thread is laid in by selected sliders at spaced needles at the feeder at which it was fed, and is retained by other sliders not actuated at said feeder and laid in by said other sliders at at least one subsequent feeder.

12. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, means at at least one feeder for feeding elastic yarn to said sliders, means for actuating said sliders selectively at different feeds to pass said elastic thread over the heads of spaced needles in said circular series of needles, short butts on at least said spaced needles, long butts on at least the needles adjacent thereto, and means at each feeder at which said sliders are actuated for raising said long butt needles to a level above the level of said sliders and said short butt needles before said sliders are actuated, whereby said elastic thread is laid in by selected sliders at spaced needles at the feeder at which it was fed, and is retained by other sliders not actuated at said feeder and laid in by said other sliders at at least one subsequent feeder.

13. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, butts on said sliders disposed at different points along the length of different sliders, means at at least one feeder for feeding elastic yarn to said sliders, and cam means having different cam tracks adapted to engage the butts at said different points and to actuate said sliders selectively at different feeds, in accordance with the butts on said sliders, to pass said elastic thread over the heads of spaced needles in said circular series of needles whereby said elastic thread is laid in by selected sliders at spaced needles at the feeder at which it was fed, and is retained by other sliders not actuated at said feeder and laid in by said other sliders at at least one subsequent feeder.

14. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, short butts on some of said sliders and long butts on the remainder of said sliders, means at at least one feeder for feeding elastic yarn to said sliders, and cam means adapted to engage said short and long butts and to actuate said sliders selectively at different feeds, in accordance with the butts on said sliders, to pass said elastic thread over the heads of spaced needles in said circular series of needles whereby said elastic thread is laid in by selected sliders at spaced needles at the feeder at which it was fed, and is retained by other sliders not actuated at said feeder and laid in by said other sliders at at least one subsequent feeder.

15. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, short butts on some of said sliders and long butts on the remainder of said sliders, said butts being at different points along the length of different sliders, means at at least one feeder for feeding elastic yarn to said sliders, and cam means for said sliders having different cam tracks for engaging the butts at said different points, each cam track being adapted to operate the butts engaged thereby at selected feeders and to actuate said long and short butts differentially, thereby actuating said sliders selectively at different feeds, in accordance with the butts on said sliders, to pass said elastic thread over the heads of spaced needles in said circular series of needles whereby said elastic thread is laid in by selected sliders at spaced needles at the feeder at which it was fed, and is retained by other sliders not actuated at said feeder and laid in by said other sliders at at least one subsequent feeder.

16. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, short butts on some of said sliders and long butts on the remainder of said sliders, said butts being at different points along the length of different sliders, means at at least one feeder for feeding elastic yarn to said sliders, cam means for said sliders having different cam tracks for engaging the butts at said different points, each cam track being adapted to operate the butts engaged thereby at selected feeders and to actuate said long and short butts differentially, thereby actuating said sliders selectively at different feeds, in accordance with the butts on said sliders, to pass said elastic thread over the heads of spaced needles in said circular series of needles, short butts on at least said spaced needles, long butts on at least the needles adjacent thereto, and means at each feeder at which said sliders are actuated for raising said long butt needles to a level above the level of said sliders and said short butt needles before said sliders are actuated, whereby said elastic thread is laid in by selected sliders at spaced needles at the feeder at which it was fed, and is retained by other sliders not actuated at said feeder and laid in by said other sliders at at least one subsequent feeder.

17. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, said sliders being of two kinds, means at at least one feeder for feeding elastic yarn to said sliders, and means for actuating said two kinds of sliders alternately at different feeders to pass said elastic thread over the heads of spaced needles in said circular series of needles whereby said elastic thread is laid in by one kind of slider at spaced needles at the feeder at which it was fed, and is retained by the other kind of slider and laid in by said other kind of slider at at least one subsequent feeder.

18. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, said sliders being of at least three kinds, means at at least one feeder for feeding elastic yarn to said sliders, and means for actuating said three kinds of sliders, one kind at a time at different feeders, to pass said elastic thread over the heads of spaced needles in said circular series of needles whereby said elastic thread is laid in by one kind of slider at spaced needles at the feeder at which it was fed, and is retained by said other kinds of slider and laid in thereby at different subsequent feeders.

19. A multi-feeder circular knitting machine for the production of elastic knitted fabric, said machine comprising a circular series of needles, a plurality of feeders each adapted to knit a ground thread on said needles, a circular series of sliders fewer in number than said needles and adapted to slide laterally between said needles, short butts on some of said sliders and long butts on the remainder of said sliders, said butts being disposed at two different points along the length of different sliders, cam means for said sliders having two cam tracks for engaging the butts at said different points, each cam track being adapted to actuate said butts at selected feeders, one of said cam tracks actuating the long butt feeders engaged thereby at one selected feeder and all the sliders engaged thereby at the next selected feeder, and the other cam track actuating the long butt sliders engaged thereby at the third selected feeder and all the sliders engaged thereby at the fourth selected feeder, means for feeding elastic yarn to said sliders at said first and third selected feeders. short butts on at least said spaced needles, long butts on at least the needles adjacent thereto and means at each feeder at which said sliders are actuated for raising said long butt needles to a level above the level of said sliders and said short butt needles before said sliders are actuated, whereby each of said elastic threads is laid in by long butt sliders at spaced needles at the feeder at which it was fed, is again laid in by short butt sliders at a subsequent feeder, and is again laid in by long butt sliders, together with the other elastic yarn, at a further subsequent feeder.

20. A multi-feeder circular knitting machine for the production of elastic knitted fabric, said machine comprising a needle cylinder, a circular series of needles mounted in tricks in said cylinder, a plurality of feeders each adapted to knit a ground thread on said needles, a dial cooperating with said cylinder, a circular series of sliders mounted in radial tricks in said dial, said sliders being fewer in number than said needles and adapted to slide laterally between said needles, means at at least one feeder for feeding elastic yarn to said sliders, and cam means associated with said dial for actuating said sliders selectively at different feeds to pass said elastic thread over the heads of spaced needles in said circular series of needles whereby said elastic thread is laid in by selected sliders at spaced needles at the feeder at which it was fed, and is retained by other sliders not actuated at said feeder and laid in by said other sliders at at least one subsequent feeder.

21. A multi-feeder circular knitting machine for the production of elastic knitted fabric, said machine comprising a needle cylinder, a circular series of needles mounted in tricks in said cylinder, a plurality of feeders each adapted to knit a ground thread on said needles, a dial cooperating with said cylinder, a circular series of sliders mounted in radial tricks in said dial, said sliders being fewer in number than said needles and adapted to slide laterally between said needles, short butts on some of said sliders and long butts on the remainder of said sliders, said butts being at different points along the length of different sliders, means at at least one feeder for feeding elastic yarn to said sliders, cam means for said sliders associated with said dial, said cam means having different cam tracks for engaging the butts at said different points, each cam track being adapted to operate the butts engaged thereby at selected feeders and to actuate said long and short butts differentially, thereby actuating said sliders selectively at different feeds, in accordance with the butts on said sliders, to pass said elastic thread over the heads of spaced needles in said circular series of needles, short butts on at least said spaced needles, long butts on at least the needles adjacent thereto, and means at each feeder at which said sliders are actuated for raising said long butt needles to a level above the level of said sliders and said short butt needles before said sliders are actuated, whereby said elastic thread is laid in by selected sliders at spaced needles at the feeder at which it was fed, and is retained by other sliders not actuated at said feeder and laid in by said other sliders at at least one subsequent feeder.

22. A multi-feeder circular knitting machine for the production of elastic knitted fabric, said machine comprising a needle cylinder, a circular series of needles mounted in tricks in said cylinder, a plurality of feeders each adapted to knit a ground thread on said needles, a dial cooperating with said cylinder, a circular series of sliders mounted in radial tricks in said dial, said sliders being fewer in number than said needles and adapted to slide laterally between said needles, short butts on some of said sliders and long butts on the remainder of said sliders, said butts being disposed at two different points along the length of different sliders, cam means for said sliders associated with said dial, said cam means having two cam tracks for engaging the butts at said different points, each cam track being adapted to actuate said butts at selected feeders, one of said cam tracks actuating the long butt feeders engaged thereby at one selected feeder and all the sliders engaged thereby at the next selected feeder, and the other cam track actuating the long butt sliders engaged thereby at the third selected feeder and all the sliders engaged thereby at the fourth selected feeder, means for feeding elastic yarn to said sliders at said first and third selected feeders, short butts on at least said spaced needles, long butts on at least the needles adjacent thereto and means at each feeder at which said sliders are actuated for raising said long butt needles to a level above the level of said sliders and said short butt needles before said sliders are actuated, whereby each of said elastic threads is laid in by long butt sliders at spaced needles at the feeder at which it was fed, is again laid in by short butt sliders at a subsequent feeder, and is again laid in by long butt sliders, together with the other elastic yarn, at a further subsequent feeder.

ALBERT FAIRHOLME GUYLER.
WILLIAM HENRY BOALER.